United States Patent
Safford et al.

(10) Patent No.: US 6,643,800 B1
(45) Date of Patent: Nov. 4, 2003

(54) METHOD AND APPARATUS FOR TESTING MICROARCHITECTURAL FEATURES BY USING TESTS WRITTEN IN MICROCODE

(75) Inventors: Kevin David Safford, Fort Collins, CO (US); Patrick Knebel, Ft Collins, CO (US); Russell C Brockmann, Ft Collins, CO (US); Karl P Brummel, Ft Collins, CO (US); M A Susith Rohana Fernando, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/496,367

(22) Filed: Feb. 2, 2000

(51) Int. Cl.$^7$ ................................................ G06F 11/00
(52) U.S. Cl. ........................................ 714/35; 712/227
(58) Field of Search .............................. 714/32, 35, 30; 712/226, 227, 242, 243

(56) References Cited

U.S. PATENT DOCUMENTS

| | | | | |
|---|---|---|---|---|
| 4,443,865 A | * | 4/1984 | Schultz et al. | 712/242 |
| 4,471,426 A | * | 9/1984 | McDonough | 712/211 |
| 4,482,953 A | * | 11/1984 | Burke | 714/27 |
| 4,641,308 A | * | 2/1987 | Sacarisen et al. | 714/36 |
| 4,841,434 A | * | 6/1989 | Mathewes et al. | 712/227 |
| 4,876,466 A | * | 10/1989 | Kondou et al. | 326/38 |
| 4,887,203 A | * | 12/1989 | MacGregor et al. | 712/211 |
| 5,072,447 A | * | 12/1991 | Perloff et al. | 714/712 |
| 5,155,819 A | * | 10/1992 | Watkins et al. | 712/36 |
| 5,212,693 A | * | 5/1993 | Chao et al. | 714/5 |
| 5,226,149 A | * | 7/1993 | Yoshida et al. | 714/25 |
| 5,276,863 A | * | 1/1994 | Heider | 709/222 |
| 5,398,250 A | * | 3/1995 | Nozuyama | 714/726 |
| 5,404,560 A | * | 4/1995 | Lee et al. | 712/208 |
| 5,481,684 A | * | 1/1996 | Richter et al. | 712/208 |
| 5,511,211 A | * | 4/1996 | Akao et al. | 712/36 |
| 5,557,558 A | * | 9/1996 | Daito | 702/120 |
| 5,572,666 A | * | 11/1996 | Whitman | 714/32 |
| 5,687,350 A | * | 11/1997 | Bucher et al. | 711/140 |
| 5,748,981 A | * | 5/1998 | Patchen et al. | 710/8 |
| 5,859,999 A | | 1/1999 | Morris et al. | 395/565 |
| 5,860,017 A | | 1/1999 | Sharangpani et al. | 395/800.23 |
| 5,864,660 A | * | 1/1999 | Hamameh et al. | 714/32 |
| 6,088,690 A | * | 7/2000 | Gounares et al. | 706/13 |
| 6,199,152 B1 | * | 3/2001 | Kelly et al. | 711/207 |
| 6,223,312 B1 | * | 4/2001 | Nozuyama | 714/724 |
| 6,230,290 B1 | * | 5/2001 | Heidel et al. | 714/718 |
| 6,263,429 B1 | * | 7/2001 | Siska | 712/245 |
| 6,385,740 B1 | * | 5/2002 | Treadway et al. | 714/35 |
| 6,542,981 B1 | * | 4/2003 | Zaidi et al. | 712/2 |
| 6,571,359 B1 | * | 5/2003 | Padwekar et al. | 714/40 |

OTHER PUBLICATIONS

Aylor, J.H.; Cohoon, J.P.; Feldhousen, E.L.; Johnson, B.W. Computer Design: VLSI in Computers and Processors, 1990. ICCD '90. Proceedings, 1990 IEEE International Conference on , 1990 Pages(s): 153–156.*

Wolfe, A., "Patents shed light on Merced's Innards", Electronic Engineering Times, Feb. 15, 1999.

* cited by examiner

Primary Examiner—Scott Baderman
Assistant Examiner—Gabriel Chu

(57) ABSTRACT

An apparatus and a method of testing computer microarchitectures has a test writer create a test sequence written directly in microinstructions (both native-mode and emulation-only microinstructions). The microinstruction sequence is then inserted into a reprogrammable microcode storage, replacing the normal sequence of microinstructions for a given macroinstruction. In order to execute the microinstructions, the test writer can issue the macroinstruction. The method may be implemented in a simulation model where one set of microinstructions in the reprogrammable microcode storage can be easily replaced. The method may also be applied to an actual microprocessor implementation.

6 Claims, 3 Drawing Sheets

METHOD AND APPARATUS FOR TESTING MICROARCHITECTURAL FEATURES BY USING TESTS WRITTEN IN MICROCODE

TECHNICAL FIELD

The technical field is related to mechanisms and methods for testing computer microarchitectures.

BACKGROUND

The preferred method of emulating an instruction set on a microprocessor is to convert each emulated instruction (macroinstructions) into a series of instructions in the native instruction set (microinstructions). These microinstruction sequences are stored in microcode storage. In addition, the microprocessor may provide microinstructions that are only available for use by emulation hardware and not to code running in the native mode.

With traditional techniques for testing the emulated instruction set, test writers prepare sequences of user visible macroinstructions. The emulation hardware translates the macroinstructions into microinstructions that are then executed. In order to test certain microarchitectural features, the test writer must determine sequences of macroinstructions required to produce a desired sequence of microinstructions. The microinstruction sequences may be difficult (or even impossible) to construct with only macroinstructions. Further, a long sequence of macroinstructions may be required in order to produce the desired operands or machine state, leading to excessively long tests.

SUMMARY

An improved method of testing computer microarchitectures has a test writer create a test sequence written directly in microinstructions (both native-mode and emulation-only microinstructions). This user-specified sequence is then inserted into reprogrammable microcode storage, replacing the normal sequence of microinstructions for a given macroinstruction. In order to execute the microinstructions, the test writer can issue the given macroinstruction. The method may be implemented in a simulation model where any set of microinstructions in the reprogrammable microcode storage can be easily replaced. The method may also be applied to an actual microprocessor implementation.

The method has the following advantages over current methods for testing computer microarchitectures: 1) the method allows much more precise control of microarchitectural features such as operands, timing and parallelism that may be very difficult to achieve with macroinstructions; 2) the method allows tests to be written more efficiently; 3) the method shields the test writer from changes in the microcode; and 4) the method allows the test writer to test sequences of events that are not possible in a design, but may be required at later steps in the design process.

BRIEF DESCRIPTION OF THE DRAWINGS

The apparatus and method for testing microarchitectural features will be discussed in detail with reference to the following figures, wherein like numerals refer to like features, and wherein.

DETAILED DESCRIPTION

Figure 1:
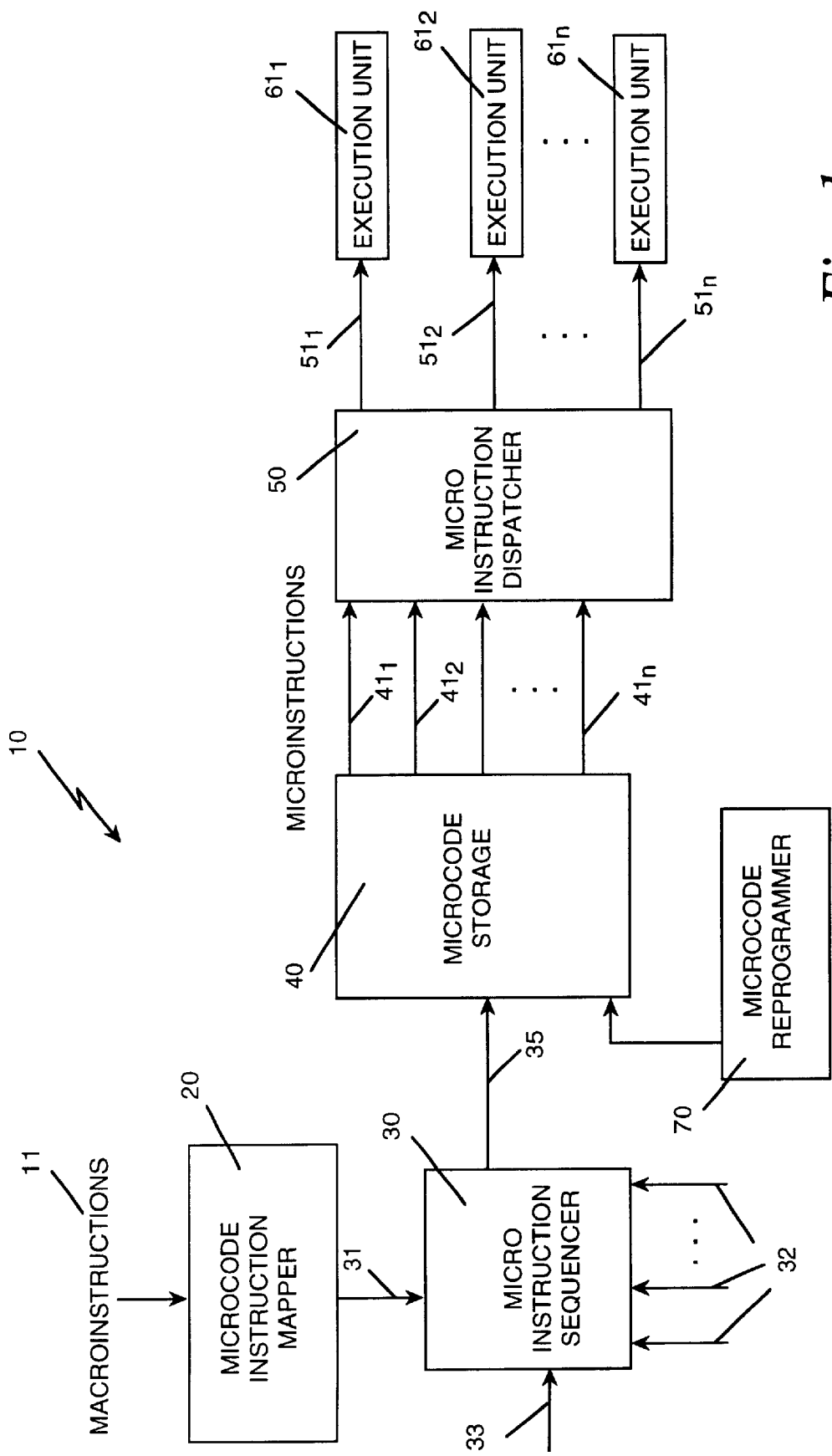
FIG. 1 is a block diagram of an apparatus used for testing microarchitectural features.

Complex instruction set computer (CISC) architectures can be very powerful in that the CISC architecture allows for complicated and flexible ways of calculating elements such as memory addresses. The CISC instructions, or macroinstructions, may include one or more instructions of microcode. During development of a microprocessor, a test writer must verify that the macroinstructions executed by the microprocessor achieve the desired result. However, because the macroinstructions may include a number of microinstructions, the test writer may not be able to test the effect of each of the microcode instructions or a particular sequence of microinstructions by simply writing a test using the macroinstructions.

The process of writing a proper test sequence and verifying the function of a microprocessor design may be complicated when the microprocessor is designed to execute more than one instruction set. For example, a microprocessor may be designed to execute both CISC (e.g., IA-32) and reduced instruction set computer (RISC) (e.g., IA-64) instructions. In this example, the test writer must ensure that the CISC instructions are correctly emulated with desired sequences of microinstructions.

Furthermore, the test writer must reverse-engineer the sequence of macroinstructions that gives the desired sequence of microinstructions that is needed to test the microprocessor. This can be very difficult and time-consuming to accomplish. If the designer then changes the microcode in the processor, the test writer may have to revise the test to recapture the original intended behavior. It is also possible that the behaviors that were originally possible in the microprocessor are made impossible by microcode changes or vise versa. By writing tests directly in microcode, the test writer solves both these problems.

In addition, during the early design stages of a microprocessor, the designer may be constantly revising the microcode used to emulate the macroinstructions. In doing this, the designer can introduce new sequences of microcode that have never been executed by the microprocessor. This can lead to latent bugs being discovered. By using tests written in microcode, sequences of microcode that are impossible in the normal operation of the microprocessor may be tested. This allows the designers to create a more robust design that will tolerate changes in the microcode sequences used to emulate the macroinstructions.

Finally, other hardware control structures on the chip can change during the design stages of a microprocessor. The designer must then determine if the changes will introduce errors in the microprocessor's behavior. This task may be eased if the designer can have the microprocessor design tested quickly and accurately. Use of microinstruction sequences can be an efficient way to test the new microprocessor designs.

Furthermore, during the early design stages of a microprocessor, the designer may be constantly revising the basic microcode operating on the microprocessor. The designer must then determine if the changes will introduce errors in the microprocessor's behavior. This task may be eased if the designer can have the microprocessor design tested quickly and accurately. Use of microinstruction sequences can be an effective way to test the new microprocessor designs.

FIG. 1 is an overall block diagram of an apparatus for testing a computer microarchitecture using tests written in microcode. A test apparatus 10 includes a macroinstruction to microinstruction mapper 20. The macroinstruction to microinstruction mapper 20 receives one or more macroinstructions 11 and provides an output 31 to a microinstruction sequencer 30. The microinstruction sequencer 30 receives inputs corresponding to entry points for different events 33 and state information 32 from the computer microarchitecture or microprocessor to be tested. The microinstruction sequencer 30 outputs a microcode address sequence 35 to a microcode storage 40, some or all of which is reprogrammable by means known to those skilled in the art.

The microinstruction sequencer 30 may be implemented as a state machine to control operation of the reprogrammable microcode storage 40, and thereby control the sequence of microinstructions that are being executed.

The reprogrammable microcode storage 40 stores microcode instructions that may be issued to emulate the particular macroinstruction 11 entered into the macroinstruction to microinstruction mapper 20. The reprogrammable microcode storage 40 may store a large number of microinstructions. The reprogrammable microcode storage 40 will output one or more microinstructions $41_i$ to a microinstruction dispatcher 50.

The microinstruction dispatcher 50 sends particular microinstructions $51_i$ to corresponding execution units $61_i$ for execution of the microinstructions. The execution units $61_i$ may be integer execution units, floating point execution units, and branch units, for example.

A microcode reprogrammer 70 is used to reprogram microcode in the reprogrammable microcode storage 40. The microcode reprogrammer 70 may be used to reprogram any microinstruction or microinstruction sequence. The reprogrammed microinstruction sequence, which may be any arbitrary sequence of microinstructions, then constitutes the test that is to be run on the computer microarchitecture.

The test may be started by issuing a macroinstruction to the macroinstruction to microinstruction mapper 20. The resulting output 35 from the microinstruction sequencer 30 is used in the reprogrammable microcode storage 40 to execute the reprogrammed microinstruction sequence.

Figure 2:
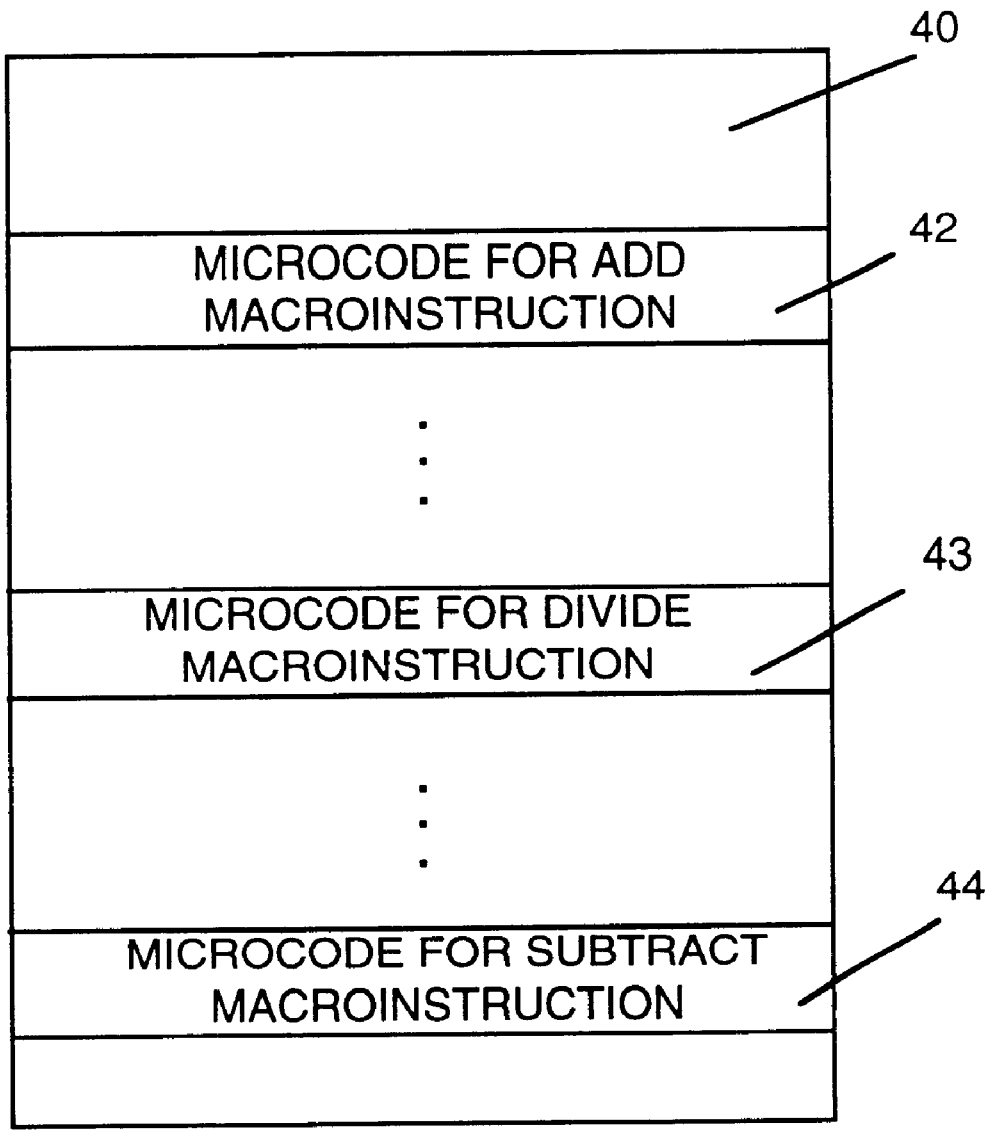
FIG. 2 is a logical diagram of a reprogrammable microcode storage.

FIG. 2 is a logical diagram of the reprogrammable microcode storage 40. The reprogrammable microcode storage 40 is shown as containing microcode for a number of macroinstructions. For example, the reprogrammable microcode storage 40 includes a microcode sequence for an ADD macroinstruction 42, a microcode sequence for a DIVIDE macroinstruction 43, and a microcode sequence for a SUBTRACT macroinstruction 44. As noted before, the reprogrammable microcode storage 40 may contain many more of these microcode lines. Which particular microcode lines are read out of the reprogrammable microcode storage 40 may be determined by the output 35 of the microinstruction sequencer 30 shown in FIG. 1.

Figure 3:
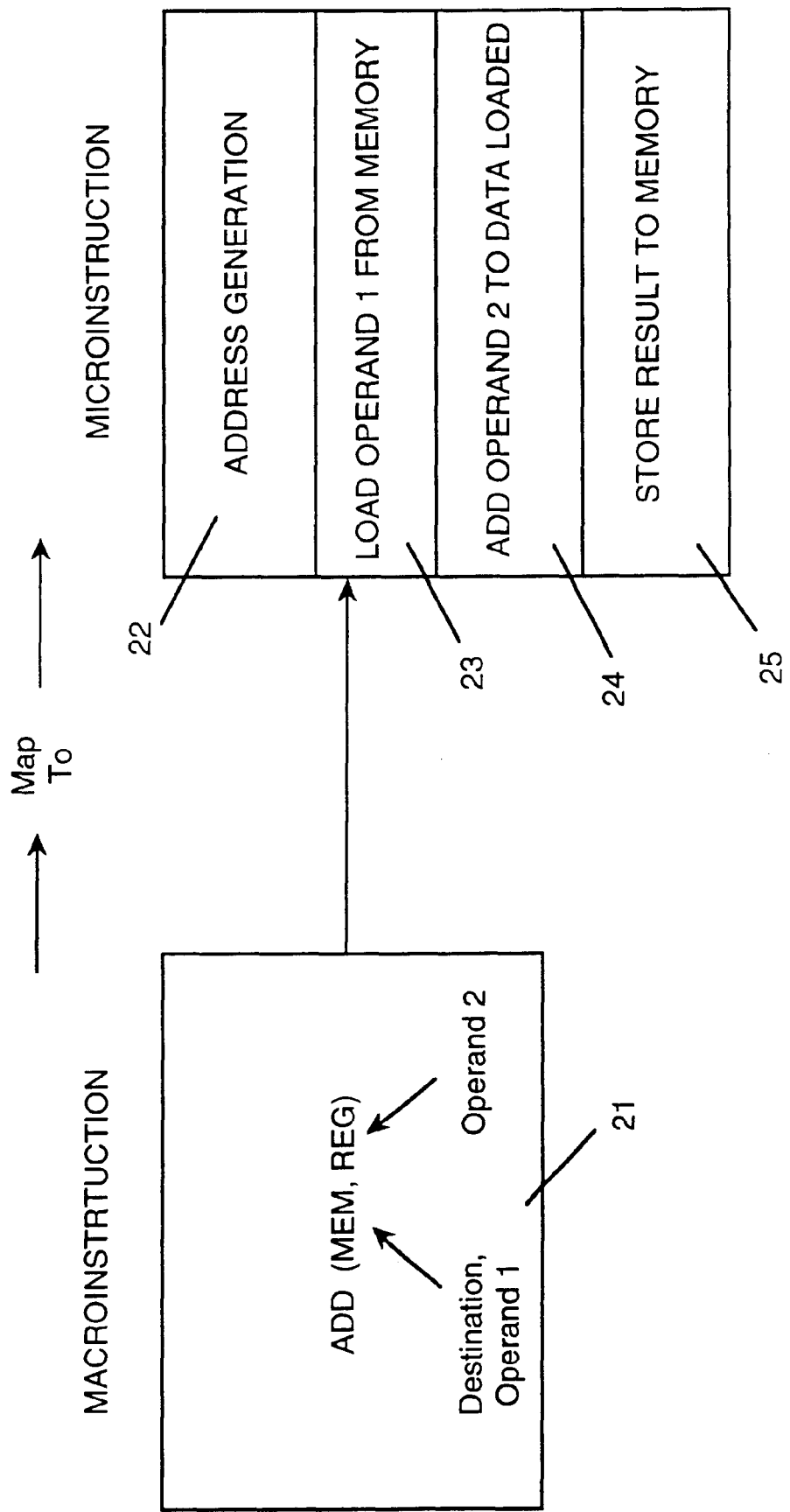
FIG. 3 is a logical diagram of the conversion process between macroinstructions and microinstructions.

FIG. 3 is a logical diagram showing the relationship between the macroinstruction and its corresponding microinstructions. In FIG. 3, one particular variant of an ADD macroinstruction 21 includes MEM (memory) and REG (register) operands. In this case, "memory" means both the operand 1 and destination, and "register" is a second operand or operand 2. The ADD macroinstruction 21 maps to one or more microinstructions. As shown in FIG. 3, the microinstructions include an address generation microinstruction 22, a load operand from memory microinstruction 23, an ADD operand 2 to data loaded microinstruction 24 and a store results to memory microinstruction 25. Thus, the microinstructions 22–25 are actually executed to emulate the ADD macroinstruction 21. The ADD macroinstruction 21 is intended to add to the data specified in the memory location, the data that is specified in the register, and write the data back to memory into the same memory location.

Returning to FIG. 1, assuming a test has been written in terms of macroinstructions, such as the ADD macroinstruction 21, the macroinstruction is read into the macroinstruction to microinstruction mapper 20, which then produces an entry point to the microinstruction sequencer 30. Once the microinstruction sequencer 30 has identified a particular sequence of microinstructions to be executed, the information 35 is fed to the reprogrammable microcode storage 40 and the design test is executed through the microinstruction dispatcher 50 and the execution units $61_i$.

As can be seen from FIG. 3, a test writer may desire to test the microprocessor's response to an ADD macroinstruction by specifying the ADD macroinstruction be executed. Furthermore, the test writer may want to test microprocessor response to the microinstructions in a sequence other than that specified by the particular macroinstruction, may desire to test microprocessor response to a series of the same or similar microinstructions, or may desire to test the microprocessor following design changes or changes to the microcode used to emulate the macroinstruction. For example, the test writer may desire to test microprocessor response to ten address generation microinstructions in sequence. However, the test writer may not be able to accomplish these aims by using or specifying a particular macroinstruction or sequence of macroinstructions.

Using the apparatus 10 shown in FIG. 1, the test writer can specify any sequence of microinstructions to be executed on the microprocessor. For example, if the test writer desires to test the microprocessor by specifying ten address generation microcode instructions executed in sequence, the test writer could use the ADD instruction 21 shown in FIG. 3, stripping out microinstructions 23–25 and using only the address generation microinstruction 22 but repeating this operation ten times. The reprogrammable microcode storage 40 could then be reprogrammed with reprogramming hardware 70 with the ten address generation microinstructions 22 and sequenced through the microprocessor to be tested. The test writer would then be easily able to test the microprocessor as it functions in the case of having to execute ten address generation microinstructions in a row.

The ability to test a microprocessor or chip using the apparatus 10 shown in FIG. 1 may be implemented as a model operating on a computer workstation. That is, the functions represented by the modules shown in FIG. 1 may be implemented as a functional model that can be used to test the early and subsequent stages of the microprocessor or chip design. Specifically, the apparatus 10 can be seen to be a model of one or more hardware devices programmed with specific functionality. Thus, the apparatus 10 may be a model of a design of an electronic device, and need not be associated with a physical device. The apparatus 10 may perform in the same manner when the apparatus 10 is replaced with any program.

However, the components shown in FIG. 1 may also be included as discrete hardware devices on a microprocessor or chip. In this case, the reprogrammable microcode storage 40 may require reprogramming in order to handle changes in test designs.

Furthermore, in the case where the apparatus 10 is a firmware or hardware program embodied on a physical device, the connections to the macroinstruction sources and other data sources can be hardware or software connections, as appropriate. Along the same lines of generality, the other components illustrated in FIG. 1 can be firmware or hardware modules, rather than software modules.

If implemented as a software model, the modules or programs (both terms are used interchangeably) in FIG. 1 can be stored or embodied on a computer readable medium in a variety of formats, such as source code or executable code, for example. Computer readable mediums include both storage devices and signals. Exemplary computer readable storage devices include conventional computer system RAM, ROM, EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the apparatus 10 can be configured to access, including signals downloaded through the Internet or other networks.

The terms and descriptions used herein are set forth by way of illustration only and are not meant as limitations. Those skilled in the art will recognize that many variations are possible within the spirit and scope of the following claims, and their equivalents, in which all terms are to be understood in their broadest possible sense unless otherwise indicated.

What is claimed is:

1. An apparatus for testing a computer microarchitecture, comprising:

microcode related to one or more macroinstructions; reprogrammed test microcode for testing the computer microarchitecture, wherein the reprogrammed test microcode comprises a sequence of microinstructions executed to test the computer microarchitecture; and a microcode sequencer, wherein the microcode sequencer receives inputs corresponding to one or more of event entry points and computer state information and produces an address for the microcode.

2. The apparatus of claim 1, further comprising:

a dispatcher that receives the sequence of microinstructions and provides outputs; and execution units that receive the outputs and execute microinstructions.

3. The apparatus of claim 2, wherein the execution units comprise one or more of integer execution units, floating point execution units, and branch units.

4. The apparatus of claim 1, wherein the computer microarchitecture supports multiple instruction sets.

5. The apparatus of claim 1, further comprising a macroinstruction to microinstruction mapper that maps macroinstructions into sequences of microinstructions.

6. The apparatus of claim 1, further comprising a microcode reprogrammer that produces the reprogrammed test microcode.

* * * * *